US012175413B2

(12) United States Patent
Meanor et al.

(10) Patent No.: US 12,175,413 B2
(45) Date of Patent: Dec. 24, 2024

(54) ARTIFICIAL INTELLIGENCE FOR FREIGHT ESTIMATION

(71) Applicants: Covestro LLC, Pittsburgh, PA (US); Covestro Deutschland AG, Leverkusen (DE)

(72) Inventors: Alison Meanor, Sewickley, PA (US); Michael Burns, Sewickley, PA (US); Severin Mueller-Platz, Bergisch Gladbach (DE); Sebastian Telgen, Korschenbroich (DE)

(73) Assignees: Covestro LLC, Pittsburgh, PA (US); Covestro Deutschland AG, Leverkusen (DE)

( * ) Notice: Subject to any disclaimer, the term of this patent is extended or adjusted under 35 U.S.C. 154(b) by 109 days.

(21) Appl. No.: 17/574,869

(22) Filed: Jan. 13, 2022

(65) Prior Publication Data

US 2022/0327482 A1    Oct. 13, 2022

Related U.S. Application Data

(60) Provisional application No. 63/134,989, filed on Jan. 8, 2021.

(51) Int. Cl.
*G06Q 10/0834* (2023.01)
*G06F 18/214* (2023.01)
*G06N 20/20* (2019.01)

(52) U.S. Cl.
CPC ..... *G06Q 10/08345* (2013.01); *G06F 18/214* (2023.01); *G06N 20/20* (2019.01)

(58) Field of Classification Search
CPC .............................. G06N 20/20; G06F 18/214
See application file for complete search history.

(56) References Cited

U.S. PATENT DOCUMENTS 10,496,927 B2 * 12/2019 Achin ................. G06N 20/10
2020/0161867 A1 * 5/2020 Zhou .................. G06N 3/084

* cited by examiner

*Primary Examiner* — George Chen
*Assistant Examiner* — Duane N. Moore
(74) *Attorney, Agent, or Firm* — Steven D. Czajkowski; Richard P. Bender

(57) ABSTRACT

Provided is a system to generate a machine learning model to provide a predicted cost associated with shipping a shipment of freight from an origin of the shipment of freight to a destination of the shipment of freight based on a training dataset and a predicted distance and to determine the predicted cost associated with shipping a specified shipment of freight from the origin of the specified shipment of freight to the destination of the specified shipment of freight using the machine learning model. The training dataset includes data associated with shipments of freight conducted during a first time interval and data associated with shipments of freight conducted during a second time interval. The first time interval is at least a year and the second time interval is shorter than the first time interval. A computer implemented method and computer program product are also provided.

19 Claims, 10 Drawing Sheets

435
Generate an updated training dataset associated with the freight prediction machine learning model

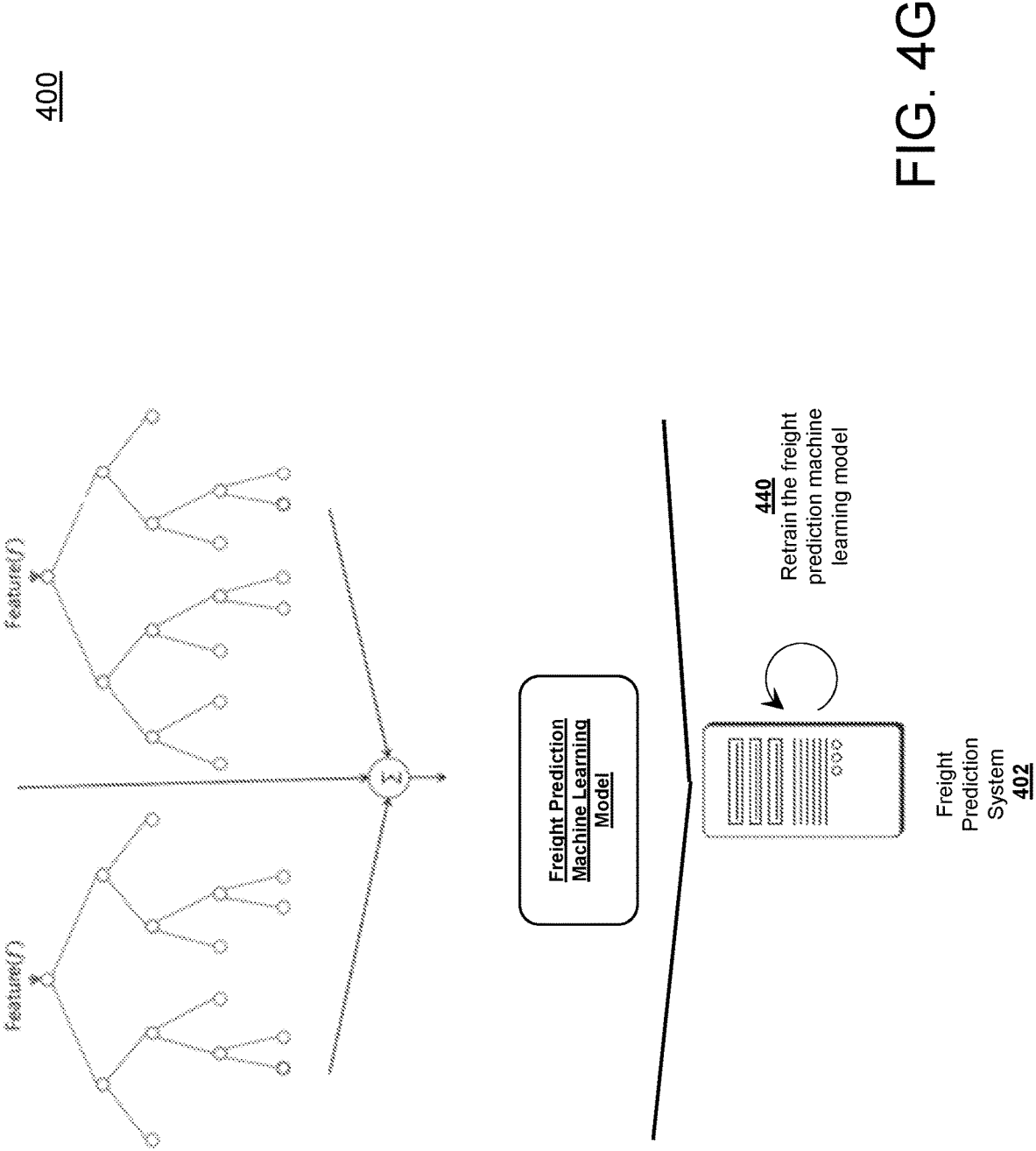

ARTIFICIAL INTELLIGENCE FOR FREIGHT ESTIMATION

CROSS-REFERENCE TO RELATED APPLICATION

This application claims priority to U.S. Provisional Application No. 63/134,989, filed Jan. 8, 2021, the disclosures of which are incorporated herein by reference.

BACKGROUND

1. Field

This disclosure relates generally to the use of artificial intelligence in the form of a machine learning model and, in some non-limiting embodiments, to systems, methods, and computer program products for using a machine learning model to predict costs associated with shipping a shipment of freight.

2. Technical Considerations

Machine learning may be a field of computer science that uses statistical techniques to provide a computer system with the ability to learn (e.g., to progressively improve performance of) a task with data without the computer system being explicitly programmed to perform the task. In some instances, a machine learning model may be developed for a set of data so that the machine learning model may perform a task, for example, a task associated with making a prediction with regard to the set of data.

A freight rate may refer a cost at which a certain freight (e.g., cargo in the form of goods) is shipped (e.g., transported) from one location to another location. The cost may depend on a form of the freight, a mode of transportation of the freight (e.g., a mode associated with a truck, a mode associated with a ship, a mode associated with a train, a mode associated with an aircraft, etc.), a weight of the freight, and/or a distance from an initial location (e.g., a pickup location) to a destination location (e.g., a delivery location). In some examples, a freight service (e.g., a forwarding agent, a freight carrier, a shipping service, a shipping vendor, a shipper, etc.) may use dimensional weight for calculating the cost. In this situation, dimensional weight may take into account both weight and volume of the freight.

SUMMARY

Accordingly, disclosed are systems, methods, and computer program products for using a machine learning model to predict costs associated with a shipment of freight.

Further non-limiting embodiments are set forth in the following numbered clauses:

Clause 1: A system for predicting costs associated with shipping freight, comprising: at least one processor programmed or configured to: determine a predicted distance between an origin of a shipment of freight to a destination of the shipment of freight; generate a machine learning model to provide a predicted cost associated with shipping the shipment of freight from the origin of the shipment of freight to the destination of the shipment of freight based on a training dataset and the predicted distance, wherein the training data set comprises data associated with shipments of freight conducted during a first time interval and data associated with shipments of freight conducted during a second time interval, and wherein the first time interval is at least a year and wherein the second time interval is shorter than the first time interval; and determine a predicted cost associated with shipping a specified shipment of freight from an origin of the specified shipment of freight to a destination of the specified shipment of freight using the machine learning model.

Clause 2: The system of clause 1, wherein the machine learning model is a first machine learning model, and wherein when determining the predicted distance between the origin of the shipment of freight to the destination of the shipment of freight, the at least one processor is programmed or configured to: generate a second machine learning model to provide a predicted distance between the origin of the shipment of freight and the destination of the shipment of freight; and use the second machine learning model to provide an output, wherein the output comprises the predicted distance between the origin of the shipment of freight and the destination of the shipment of freight; and wherein the first machine learning model is different from the second machine learning model.

Clause 3: The system of clauses 1 or 2, wherein when generating the second machine learning model, the at least one processor is programmed or configured to: generate the second machine learning model to provide the predicted distance between the origin of the shipment of freight and the destination of the shipment of freight, wherein the predicted distance is based on a calculation using a Haversine formula.

Clause 4: The system of any of clauses 1-3, wherein the at least one processor is further programmed or configured to: generate the training dataset for the first machine learning model, wherein a portion of the training dataset comprises the output of the second machine learning model.

Clause 5: The system of any of clauses 1-4, wherein the at least one processor is further programmed or configured to: provide the output of the second machine learning model as an input to the first machine learning model; and wherein when determining the predicted cost associated with shipping the shipment of freight, the at least one processor is further programmed or configured to: determine the predicted cost associated with shipping the specified shipment of freight from the origin of the specified shipment of freight to the destination of the specified shipment of freight using the first machine learning model based on the input to the first machine learning model.

Clause 6: The system of any of clauses 1-5, wherein the at least one processor is further programmed or configured to: determine a measure of feature importance associated with at least one feature of the machine learning model.

Clause 7: The system of any of clauses 1-6, wherein the at least one processor is further programmed or configured to: generate an updated training dataset at a predetermined time interval, wherein the updated training data set comprises data associated with shipments of freight conducted during an updated first time interval and data associated with shipments of freight conducted during an updated second time interval, and wherein the updated first time interval is at least a year and wherein the updated second time interval is shorter than the updated first time interval; and retrain the machine learning model according to the predetermined time interval based on the updated training dataset.

Clause 8: The system of any of clauses 1-7, wherein when retraining the machine learning model, the at least one processor is programmed or configured to: retrain the machine learning model according to a recent time interval based on the updated training dataset.

Clause 9: The system of any of clauses 1-8, wherein a plurality of features of the machine learning model comprises: a feature associated with a weight of a shipment of freight; a feature associated with a distance between an origin of a shipment of freight and a destination of the shipment of freight; a feature associated with a time period during which a shipment of freight is to be shipped; a feature associated with at least one product included in a shipment of freight; or any combination thereof.

Clause 10: The system of any of clauses 1-9, wherein the machine learning model is a machine learning model generated according to an ensemble method.

Clause 11: The system of any of clauses 1-10, wherein the machine learning model comprises a random forest algorithm.

Clause 12: A computer program product for predicting costs associated with shipping freight comprising at least one non-transitory computer-readable medium including one or more instructions that, when executed by at least one processor, cause the at least one processor to: determine a predicted distance between an origin of a shipment of freight to a destination of the shipment of freight; generate a machine learning model to provide a predicted cost associated with shipping the shipment of freight from the origin of the shipment of freight to the destination of the shipment of freight based on a training dataset and the predicted distance, wherein the training data set comprises data associated with shipments of freight conducted during a first time interval and data associated with shipments of freight conducted during a second time interval, and wherein the first time interval is at least a year and wherein the second time interval is shorter than the first time interval; and determine a predicted cost associated with shipping a specified shipment of freight from an origin of the specified shipment of freight to a destination of the specified shipment of freight using the machine learning model.

Clause 13: The computer program product of clause 12, wherein the machine learning model is a first machine learning model, and wherein the one or more instructions that cause the at least one processor to determine the predicted distance between the origin of the shipment of freight to the destination of the shipment of freight, cause the at least one processor to: generate a second machine learning model to provide a predicted distance between the origin of the shipment of freight and the destination of the shipment of freight; and use the second machine learning model to provide an output, wherein the output comprises the predicted distance between the origin of the shipment of freight and the destination of the shipment of freight; and wherein the first machine learning model is different from the second machine learning model.

Clause 14: The computer program product of clauses 12 or 13, wherein the one or more instructions that cause the at least one processor to generate the second machine learning model, cause the at least one processor to: generate the second machine learning model to provide the predicted distance between the origin of the shipment of freight and the destination of the shipment of freight, wherein the predicted distance is based on a calculation using a Haversine formula.

Clause 15: The computer program product of any of clauses 12-14, wherein the one or more instructions further cause the at least one processor to: generate the training dataset for the first machine learning model, wherein a portion of the training dataset comprises the output of the second machine learning model.

Clause 16: The computer program product of any of clauses 12-15, wherein the one or more instructions further cause the at least one processor to: provide the output of the second machine learning model as an input to the first machine learning model; and wherein the one or more instructions that cause the at least one processor to determine the predicted cost associated with shipping the shipment of freight, cause the at least one processor to: determine the predicted cost associated with shipping the specified shipment of freight from the origin of the specified shipment of freight to the destination of the specified shipment of freight using the first machine learning model based on the input to the first machine learning model.

Clause 17: The computer program product of any of clauses 12-16, wherein the one or more instructions further cause the at least one processor to: determine a measure of feature importance associated with at least one feature of the machine learning model.

Clause 18: The computer program product of any of clauses 12-17, wherein the at least one processor is further programmed or configured to: generate an updated training dataset at a predetermined time interval, wherein the updated training data set comprises data associated with shipments of freight conducted during an updated first time interval and data associated with shipments of freight conducted during an updated second time interval, and wherein the updated first time interval is at least a year and wherein the updated second time interval is shorter than the updated first time interval; and retrain the machine learning model according to the predetermined time interval based on the updated training dataset.

Clause 19: The computer program product of any of clauses 12-18, wherein the one or more instructions that cause the at least one processor to retrain the machine learning model, cause the at least one processor to: retrain the machine learning model according to a recent time interval based on the updated training dataset.

Clause 20: The computer program product of any of clauses 12-19, wherein a plurality of features of the machine learning model comprises: a feature associated with a weight of a shipment of freight; a feature associated with a distance between an origin of a shipment of freight and a destination of the shipment of freight; a feature associated with a time period during which a shipment of freight is to be shipped; a feature associated with at least one product included in a shipment of freight; or any combination thereof.

Clause 21: The computer program product of any of clauses 12-20, wherein the machine learning model is a machine learning model generated according to an ensemble method.

Clause 22: The computer program product of any of clauses 12-21, wherein the machine learning model comprises a random forest algorithm.

Clause 23: A method for predicting costs associated with shipping freight, comprising: determining, with at least one processor, a predicted distance between an origin of a shipment of freight to a destination of the shipment of freight; generating, with at least one processor, a machine learning model to provide a predicted cost associated with shipping the shipment of freight from the origin of the shipment of freight to the destination of the shipment of freight based on a training dataset and the predicted distance, wherein the training data set comprises data associated with shipments of freight conducted during a first time interval and data associated with shipments of freight conducted during a second time interval, and wherein the first time interval is at least a year and wherein the second time interval is shorter than the first time interval; and determining, with at least one processor, a predicted cost associated with shipping a specified shipment of freight from an origin of the specified shipment of freight to a destination of the specified shipment of freight using the machine learning model.

Clause 24: The method of clause 23, wherein the machine learning model is a first machine learning model, and wherein determining the predicted distance between the origin of the shipment of freight to the destination of the shipment of freight comprises: generating a second machine learning model to provide a predicted distance between the origin of the shipment of freight and the destination of the shipment of freight; and using the second machine learning model to provide an output, wherein the output comprises the predicted distance between the origin of the shipment of freight and the destination of the shipment of freight; and wherein the first machine learning model is different from the second machine learning model.

Clause 25: The method of clauses 23 or 24, wherein generating the second machine learning model comprises: generating the second machine learning model to provide the predicted distance between the origin of the shipment of freight and the destination of the shipment of freight, wherein the predicted distance is based on a calculation using a Haversine formula.

Clause 26: The method of any of clauses 23-25, further comprising: generating the training dataset for the first machine learning model, wherein a portion of the training dataset comprises the output of the second machine learning model.

Clause 27: The method of any of clauses 23-26, further comprising: providing the output of the second machine learning model as an input to the first machine learning model; and wherein determining the predicted cost associated with shipping the shipment of freight comprises: determining the predicted cost associated with shipping the specified shipment of freight from the origin of the specified shipment of freight to the destination of the specified shipment of freight using the first machine learning model based on the input to the first machine learning model.

Clause 28: The method of any of clauses 23-27, further comprising: determining a measure of feature importance associated with at least one feature of the machine learning model.

Clause 29: The method of any of clauses 23-28, further comprising: generating an updated training dataset at a predetermined time interval, wherein the updated training data set comprises data associated with shipments of freight conducted during an updated first time interval and data associated with shipments of freight conducted during an updated second time interval, and wherein the updated first time interval is at least a year and wherein the updated second time interval is shorter than the updated first time interval; retraining the machine learning model according to the predetermined time interval based on the updated training dataset.

Clause 30: The method of any of clauses 23-29, wherein retraining the machine learning model comprises: retraining the machine learning model according to a recent time interval based on the updated training dataset.

Clause 31: The method of any of clauses 23-30, wherein a plurality of features of the machine learning model comprises: a feature associated with a weight of a shipment of freight; a feature associated with a distance between an origin of a shipment of freight and a destination of the shipment of freight; a feature associated with a time period during which a shipment of freight is to be shipped; a feature associated with at least one product included in a shipment of freight; or any combination thereof.

Clause 32: The method of any of clauses 23-31, wherein the machine learning model is a machine learning model generated according to an ensemble method.

Clause 33: The method of any of clauses 23-32, wherein the machine learning model comprises a random forest algorithm.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of non-limiting embodiments are explained in greater detail below with reference to the exemplary embodiments that are illustrated in the accompanying schematic figures, in which:

FIGS. 4A-4G are diagrams of a non-limiting embodiment of an implementation of a process for predicting costs associated with shipping freight.

DESCRIPTION

Figure 1:
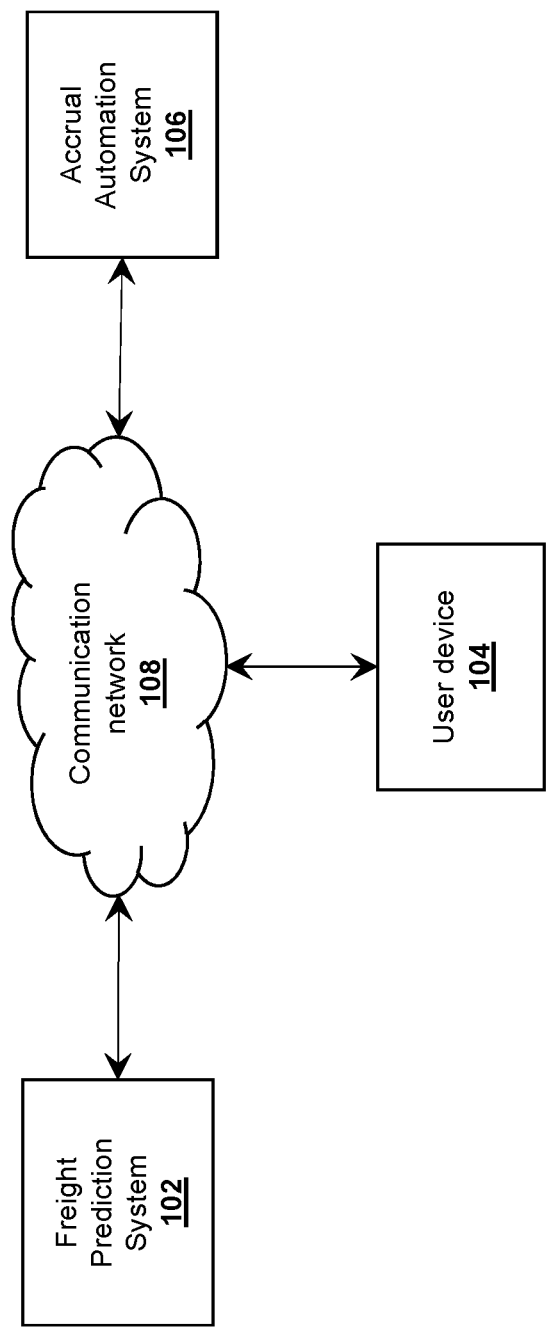
FIG. 1 is a diagram of a non-limiting embodiment of a system for predicting costs associated with shipping freight.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "system" may refer to one or more computing devices or combinations of computing devices such as, but not limited to, processors, servers, client devices, software applications, serverless cloud computing systems, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

In some non-limiting embodiments, an entity may desire to ship a shipment of freight from an origin of the shipment of freight to a destination of the shipment of freight by hiring a freight service to ship the shipment of freight. In some examples, the entity may have the freight service conduct a plurality of shipments of freight over a time interval, and the entity may desire to estimate a cost associated with shipping the shipment of freight before shipping the shipment of freight.

However, it may be overly complicated for the entity to accurately predict the cost associated with shipping the shipment of freight based on the entity not having advanced knowledge of how the freight service calculates the cost associated with shipping the shipment of freight. In addition, the entity may not be able to accurately predict the cost associated with shipping the shipment of freight because of seasonal variations and/or short terms variations in conditions that affect the cost associated with shipping the shipment of freight. Such conditions may include costs associated with fuel for shipping, weather related conditions that affect the ability to ship the shipment of freight, and other conditions, such as natural disasters and long-term emergency situations (e.g., a national pandemic).

In some non-limiting embodiments, a freight prediction system is disclosed that may generate a freight prediction machine learning model to provide a predicted cost (e.g., an expected cost) associated with shipping the shipment of freight from the origin of the shipment of freight to the destination of the shipment of freight based on a training dataset and may use the machine learning model to determine a predicted cost associated with shipping the shipment of freight from the origin of the specified shipment of freight to the destination of the specified shipment of freight. In some non-limiting embodiments, the training dataset includes data associated with shipments of freight conducted during a first time interval and data associated with shipments of freight conducted during a second time interval. In some non-limiting embodiments, the first time interval is at least a year, and wherein the second time interval is shorter than the first time interval.

In addition, the freight prediction system may generate a distance prediction machine learning model to provide a predicted distance between the origin of the shipment of freight and the destination of the shipment of freight and may use the predicted distance machine learning model to provide an output that is used to generate the freight prediction machine learning model. In addition, the freight prediction system may generate an updated training dataset at a predetermined time interval and may retrain the machine learning model according to the predetermined time interval based on the updated training dataset.

In this way, non-limiting embodiments of the present disclosure may allow for predicting the cost associated with shipping the shipment of freight. In addition, non-limiting embodiments of the present disclosure may allow for more accurately predicting the cost associated with shipping the shipment of freight based on seasonal variations and/or short terms variations in conditions that affect the cost associated with shipping the shipment of freight.

Referring now to FIG. 1, FIG. 1 is a diagram of a non-limiting embodiment of an environment 100 in which devices, systems, methods, and/or products described herein may be implemented. As shown in FIG. 1, environment 100 includes freight prediction system 102, user device 104, and accrual automation system 106. Freight prediction system 102, user device 104, and accrual automation system 106 may interconnect (e.g., establish a connection to communicate information) via wired connections, wireless connections, or a combination of wired and wireless connections.

Freight prediction system 102 may include one or more devices capable of being in communication with user device 104 and/or accrual automation system 106 via communication network 108. For example, freight prediction system 102 may include a server, a group of servers, and/or other like devices. In some non-limiting embodiments, freight prediction system 102 may host a machine learning model (e.g., a freight prediction machine learning model or a predicted distance machine learning model) in a web service applications environment (e.g., a cloud based environment).

User device 104 may include one or more devices capable of being in communication with freight prediction system 102 and/or accrual automation system 106 via communication network 108. For example, user device 104 may include one or more computing devices, such as one or more desktop computers, one or more laptop computers, and/or one or more mobile devices (e.g., one or more smartphones, one or more personal digital assistants (PDAs), etc.). In some non-limiting embodiments, user device 104 may be associated with a user, where user device 104 receives a user input and user device 104 provides an input command to freight prediction system 102. User device 104 may receive an output (e.g., an output response based on the input command) from freight prediction system 102, and user device 104 may display information associated with the output for the user to view.

Accrual automation system 106 may include one or more devices capable of being in communication with freight prediction system 102 and/or user device 104 via communication network 108. For example, accrual automation system 106 may include a server, a group of servers, and/or other like devices. In some non-limiting embodiments, accrual automation system 106 may provide an input to freight prediction system 102 and accrual automation system 106 may receive an output (e.g., an output response based on the input) from freight prediction system 102.

Communication network 108 may include one or more wired and/or wireless networks. For example, communication network 108 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1 are provided as an example. There may be additional systems and/or devices, fewer systems and/or devices, different systems and/or devices, or differently arranged systems and/or devices than those shown in FIG. 1. Furthermore, two or more systems and/or devices shown in FIG. 1 may be implemented within a single system or a single device, or a single system or a single device shown in FIG. 1 may be implemented as multiple, distributed systems or devices. Additionally or alternatively, one system or device of environment 100 may perform one or more functions described as being performed by another system or device of environment 100.

Figure 2:
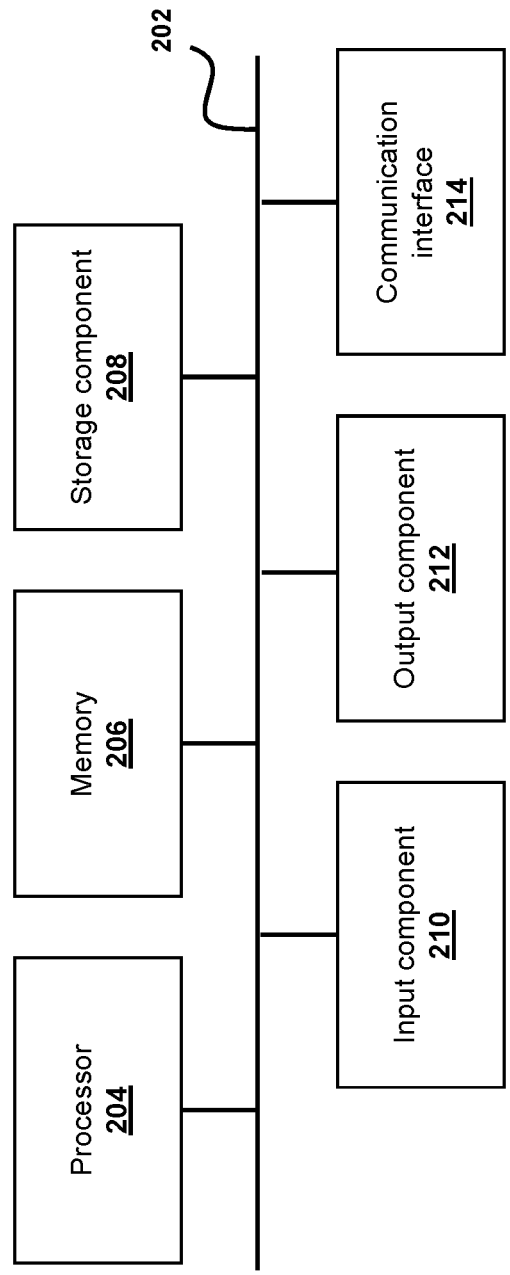
FIG. 2 is a diagram of a non-limiting embodiment of components of one or more devices and/or one or more systems of FIG. 1.

Referring now to FIG. 2, FIG. 2 is a diagram of example components of device 200. Device 200 may correspond to freight prediction system 102 (e.g., one or more devices of freight prediction system 102), user device 104, and/or accrual automation system 106 (e.g., one or more devices of accrual automation system 106). In some non-limiting embodiments, freight prediction system 102, user device 104, and/or accrual automation system 106 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, software, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like) that can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a separate receiver and transmitter, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, non-limiting embodiments described herein are not limited to any specific combination of hardware circuitry and software.

Memory 206 and/or storage component 208 may include data storage or one or more data structures (e.g., a database and/or the like). Device 200 may be capable of retrieving information from, storing information in, or searching information stored in the data storage or one or more data structures in memory 206 and/or storage component 208. For example, the information may include encryption data, input data, output data, data associated with one or more shipments of freight, data associated with accounting for one or more shipments of freight, and/or the like.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
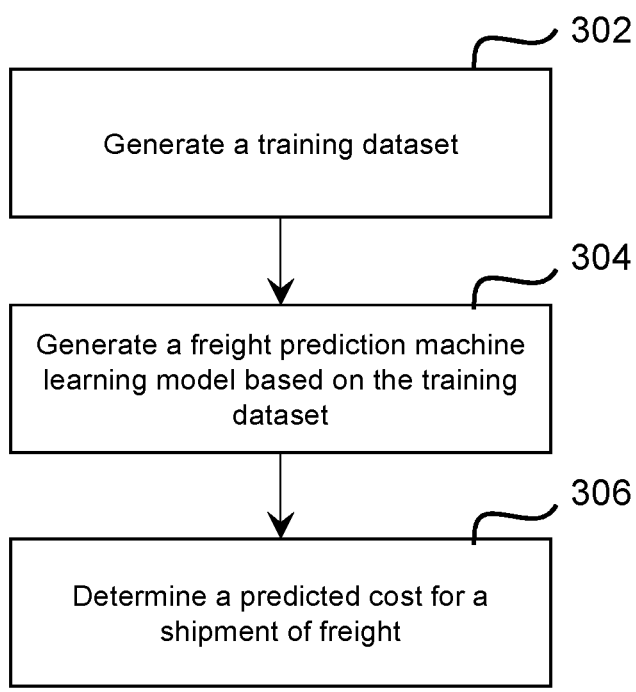
FIG. 3 is a flowchart of a non-limiting embodiment of a process for predicting costs associated with shipping freight.

Referring now to FIG. 3, FIG. 3 is a flowchart of a non-limiting embodiment of a process 300 for predicting costs associated with shipping freight. In some non-limiting embodiments, one or more of the steps (e.g., actions, functions, etc.) described with respect to process 300 may be performed (e.g., completely, partially, and/or the like) by freight prediction system 102. In some non-limiting embodiments, one or more of the steps of process 300 may be performed (e.g., completely performed, partially performed, and/or the like) by another system or a device separate from freight prediction system 102, including user device 104, and/or accrual process automation system 106.

As shown in FIG. 3, at step 302, process 300 may generate a training dataset associated with a freight prediction machine learning model. For example, freight prediction system 102 may generate the training dataset associated with the freight prediction machine learning model. In some non-limiting embodiments, the training dataset may be or may have been used to train the freight prediction machine learning model (e.g., prior to, during, and/or after the dataset is used to train the freight prediction machine learning model). For example, freight prediction system 102 may train the freight prediction machine learning model based on the training dataset associated with the freight prediction machine learning model.

In some non-limiting embodiments, the training dataset may include data associated with shipments of freight conducted (e.g., data associated with shipments of freight conducted that were previously shipped) during a time interval. For example, the training dataset may include a plurality of data records, where each data record is associated with a shipment of freight. A data record may include values of a plurality of parameters regarding the shipment of freight, where the plurality of parameters constitute a plurality of features that are used in training the freight prediction machine learning model. In some non-limiting embodiments, the plurality of features may include a feature associated with a weight of the shipment of freight (e.g., a feature associated with a quantity of product, for example, in kilograms, of the shipment of freight), a feature associated with a distance of the shipment of freight (e.g., a distance between an origin and a destination of the shipment of freight), a feature associated with a freight service that shipped the shipment of freight, a feature associated with a time interval during which the shipment of freight was shipped (e.g., a feature associated with a date, such as a year, during which the shipment of freight was shipped), a feature associated with at least one produced included in the shipment of freight (e.g., a feature associated with a type of product that was included in the shipment of freight, such as an identification of the type of product, a feature associated with a product hierarchy of a product that was included in the shipment of freight, a feature associated with an indication of whether a product that was included in the shipment of freight is considered hazardous), a feature associated with whether the shipment of freight was combined with another shipment of freight, and/or a feature associated with an origin of the shipment of freight (e.g., a warehousing location of the shipment of freight) and/or a destination of the shipment of freight. In some non-limiting embodiments, each data record of the plurality of data records may be derived from a shipping invoice for the shipment of freight associated with the data record.

In some non-limiting embodiments, the training dataset may include data associated with shipments of freight conducted during a first time interval and/or data associated with shipments of freight conducted during a second time interval. For example, the training dataset may include data associated with shipments of freight conducted during the first time interval and data associated with shipments of freight conducted during the second time interval. In some non-limiting embodiments, the first time interval may take place before the second time interval. In some non-limiting embodiments, the first time interval may overlap the second time interval. In some non-limiting embodiments, the first time interval may be at least a year. For example, the first time interval may be one year, one and a half years, two years, and/or the like. In some non-limiting embodiments, the second time interval may be less than or equal to a year. For example, the second time interval may be one month, two months, three months, a year, and/or the like. In some non-limiting embodiments, the second time interval is shorter than the first time interval. For example, the first time interval may be one year and the second time interval may be three months.

In this way, the first time interval may be specified to allow a machine learning model that uses the training dataset to capture a trend included in the data associated with shipments of freight conducted during the first time interval that occurs over a long time period and the second time interval may be specified to allow the machine learning model to capture a trend included in the data associated with shipments of freight conducted during the second time interval that occurs over a short time period (e.g., a time period that is shorter than the long time period associated with the first time interval). This may allow the machine learning model to capture long term trends as well as short term trends so that the machine learning model may make a more accurate prediction.

In some non-limiting embodiments, freight prediction system 102 may generate a distance prediction machine learning model that is to be used to generate the freight prediction machine learning model. In some non-limiting embodiments, the distance prediction machine learning model may include a machine learning model that is designed to provide a predicted distance between an origin of a shipment of freight and a destination of the shipment of freight as an output. In some non-limiting embodiments, a portion of the training dataset associated with the freight prediction machine learning model may include the output of the distance prediction machine learning model.

In some non-limiting embodiments, freight prediction system 102 may generate the training dataset associated with the freight prediction machine learning model based on the output of the distance prediction machine learning model. For example, freight prediction system 102 may generate the distance prediction machine learning model based on a training dataset (e.g., a training dataset that is the same or similar to the training dataset used to train the freight prediction machine learning model), and freight prediction system 102 may use the distance prediction machine learning model to determine a predicted distance between an origin of a shipment of freight and a destination of the shipment of freight. In some non-limiting embodiments, freight prediction system 102 may provide, for each data record in the training dataset associated with the freight prediction machine learning model, the output (e.g., a predicted distance) of the distance prediction machine learning model as a value of a feature associated with a distance of a shipment of freight. In the example above, freight prediction system 102 may update the training dataset associated with the freight prediction machine learning model with the output of the distance prediction machine learning model to provide an updated training dataset. In this way, freight prediction system 102 may use the output of the distance prediction machine learning model and the training dataset (e.g., via the updated training dataset) to generate the freight prediction machine learning model. Further, this may allow freight prediction system 102 to reduce the amount of time needed to generate the freight prediction model, since the distance prediction machine learning model may provide consistent and accurate values of predicted distance for the training dataset associated with the freight prediction machine learning.

In some non-limiting embodiments, the output of the distance prediction machine learning model may be based on a formula used to calculate a distance between two points. For example, the predicted distance provided by the distance prediction machine learning model may be based on a calculation of a distance using the Haversine formula. In some non-limiting embodiments, the Haversine formula may be used to approximate a shortest possible distance (e.g., as a crow flies) between a longitude coordinate and a latitude coordinate on the surface of the Earth. In some non-limiting embodiments, the Haversine formula may be used to calculate a distance under the assumption that the Earth is a perfect sphere with a diameter of approximately 6371 km. In some non-limiting embodiments, freight prediction system 102 may generate the distance prediction machine learning model so that the output of the distance prediction machine learning model, a predicted distance of a shipment of freight, is provided based on a calculation using the Haversine formula. In this way, freight prediction system 102 may reduce the complexity of calculating a predicted distance as compared to other distance formulas that require additional inputs beyond a longitude coordinate and a latitude coordinate and may reduce the use of network resources when generating the distance prediction machine learning model.

As shown in FIG. 3, at step 304, process 300 may include generating a freight prediction machine learning model based on the training dataset. For example, freight prediction system 102 may generate the freight prediction machine learning model to provide a predicted cost associated with shipping (e.g., transporting) a shipment of freight from an origin of the shipment of freight to a destination of the shipment of freight based on the training dataset.

In some non-limiting embodiments, the freight prediction machine learning model may include a machine learning model designed to receive, as an input, data associated with a shipment of freight, and provide, as an output, a predicted cost for shipping the shipment of freight. For example, the freight prediction machine learning model may be designed to receive data associated with the shipment of freight to be conducted during a time interval, and provide an output that includes the predicted cost associated with shipping the shipment of freight from an origin of the shipment of freight to a destination of the shipment of freight. In some non-limiting embodiments, freight prediction system 102 may store the freight prediction machine learning model (e.g., for later use). In some non-limiting embodiments, freight prediction system 102 may deploy the freight prediction machine model with a web application programming interface (API). For example, freight prediction system 102 may deploy the freight prediction machine model with a web API to be called by accrual automation system 106.

In some non-limiting embodiments, as described herein, freight prediction system 102 may process data associated with shipments of freight conducted during a time interval (e.g., historical data associated with shipments of freight conducted during a previous time interval) to obtain training data (e.g., a training dataset) for the freight prediction machine learning model. For example, freight prediction system 102 may process the data to change the data into a format that may be analyzed (e.g., by freight prediction system 102) to generate the freight prediction machine learning model. The data that is changed (e.g., the data that results from the change) may be referred to as training data. In some non-limiting embodiments, freight prediction system 102 may process the data associated with shipments of freight conducted during the time interval to obtain the training data based on receiving the data. Additionally or alternatively, freight prediction system 102 may process the data to obtain the training data based on freight prediction system 102 receiving an indication, from a user (e.g., a user associated with user device 104) of freight prediction system 102, that freight prediction system 102 is to process the data, such as when freight prediction system 102 receives an indication to generate a freight prediction machine learning model for a time interval corresponding to the data.

In some non-limiting embodiments, freight prediction system 102 may process data associated with shipments of freight by determining a freight prediction variable based on the data. A freight prediction variable may include a metric, associated with a shipment of freight, which may be derived based on the data associated with shipments of freight. The freight prediction variable may be analyzed to generate a freight prediction machine learning model. For example, the freight prediction variable may include an variable associated with a weight of shipment of freight, a variable associated with a distance between an origin of a shipment of freight and a destination of the shipment of freight, a variable associated with a time period during which a shipment of freight is to be or was shipped, a variable associated with at least one product included in a shipment of freight, and/or the like.

In some non-limiting embodiments, freight prediction system 102 may analyze the training data to generate the freight prediction machine learning model. For example, freight prediction system 102 may use machine learning techniques to analyze the training data to generate the freight prediction machine learning model. In some non-limiting embodiments, generating the freight prediction machine learning model (e.g., based on training data obtained from historical data associated with shipments of freight conducted during a previous time interval) may be referred to as training the freight prediction machine learning model. The machine learning techniques may include, for example, supervised and/or unsupervised techniques, such as decision trees, random forests, logistic regressions, linear regression, gradient boosting, support-vector machines, extra-trees (e.g., an extension of random forests), Bayesian statistics, learning automata, Hidden Markov Modeling, linear classifiers, quadratic classifiers, association rule learning, and/or the like. In some non-limiting embodiments, the freight prediction machine learning model may include a model that is specific to a particular characteristic, for example, a model that is specific to a particular freight carrier, a particular geographical area of shipment freight, a particular time interval during which shipments of freight are conducted, and/or the like. Additionally or alternatively, the freight prediction machine learning model may be specific to a particular entity (e.g., a business entity, such as a company) that uses freight carriers to ships shipments of freight. In some non-limiting embodiments, freight prediction system 102 may generate one or more freight prediction machine learning models for one or more entities, a particular group of entities, and/or one or more users of one or more entities.

In one particular example, freight prediction system 102 may generate the freight prediction machine learning model according to an ensemble method. In such an example, the freight prediction machine learning model may include a random forest algorithm, such as a regression random forest algorithm, that provides a continuous variable (e.g., a predicted cost associated with a shipment of freight) as an output. In some non-limiting embodiments, the random forest algorithm may include a supervised learning algorithm that builds a plurality of decision trees (e.g., where a decision tree is limited to no more than 10 decisions) and merges the plurality of decision trees to find an accurate and stable prediction. In this way, freight prediction system 102 may generate the freight prediction machine learning model so that the freight prediction system 102 is relatively easy to use, as compared to more complex algorithms, such as a deep learning algorithm (e.g., neural network algorithm). In addition, using a random forest algorithm for the freight prediction machine learning model may reduce an amount of time to generate the freight prediction machine learning model, as the random forest algorithm does not require a large dataset for training and is more robust towards overfitting as compared to other types of machine learning algorithms.

In some non-limiting embodiments, freight prediction system 102 may generate the freight prediction machine learning model such that at each step the random forest algorithm provides decision trees at random and only keeps the one decision tree that minimizes the remaining mean squared error (MSE) according to the formula:

$$MSE = \frac{1}{n}\sum (y - \hat{y})^2$$

where the sum of the squared difference between the predicted cost ($\hat{y}$) provided by the freight prediction machine learning model for a shipment of freight and an actual cost (y) of the shipment of freight as indicated in the training data, is divided by the number of the observations (n). The quadratic term in the MSE causes the random forest algorithm to more strongly avoid large deviations, while also being more permissive to smaller deviations.

Additionally or alternatively, when analyzing the training data, freight prediction system 102 may identify one or more variables (e.g., one or more independent variables) as predictor variables (e.g., features) that may be used to make a prediction when analyzing the training data. In some non-limiting embodiments, values of the predictor variables may be inputs to the freight prediction machine learning model. For example, freight prediction system 102 may identify a subset (e.g., a proper subset) of the variables as the predictor variables that may be used to accurately predict a cost of a shipment of freight. In some non-limiting embodiments, the predictor variables may include one or more of the freight prediction variables, as discussed above, that have a significant impact (e.g., an impact satisfying a threshold) on a predicted cost associated with shipping a shipment of freight from an origin of the shipment of freight to a destination of the shipment of freight as determined by freight prediction system 102.

In some non-limiting embodiments, freight prediction system 102 may validate the freight prediction machine learning model. For example, freight prediction system 102 may validate the freight prediction machine learning model after freight prediction system 102 generates the freight prediction machine learning model. In some non-limiting embodiments, freight prediction system 102 may validate the freight prediction machine learning model based on a portion of the training data to be used for validation. For example, freight prediction system 102 may partition the training data into a first portion and a second portion, where the first portion may be used to generate the freight prediction machine learning model, as described above. In this example, the second portion of the training data (e.g., the validation data) may be used to validate the freight prediction machine learning model.

In some non-limiting embodiments, freight prediction system 102 may validate the freight prediction machine learning model by providing validation data associated with a user (e.g., data associated with one or more shipments of freight) as input to the freight prediction machine learning model, and determining, based on an output of the freight prediction machine learning model, whether the freight prediction machine learning model correctly, or incorrectly, predicted a cost associated with a shipment of freight. In some non-limiting embodiments, freight prediction system 102 may retrain the freight prediction machine learning model based on a performance threshold. For example, freight prediction system 102 may determine that the freight prediction machine learning model does not satisfy the performance threshold, and freight prediction system 102 may trigger a retraining operation. In some non-limiting embodiments, freight prediction system 102 may validate (e.g., constantly validate) the freight prediction machine learning model based on a validation threshold. For example, freight prediction system 102 may be configured to validate the freight prediction machine learning model when the costs of an amount of shipments of freight (as identified by the validation data) are correctly predicted by the freight prediction machine learning model (e.g., when the freight prediction machine learning model correctly predicts 50% of the costs of the shipments of freight, 70% of the costs of the shipments of freight, a threshold quantity of the costs of the shipments of freight, and/or the like). In some non-limiting embodiments, freight prediction system 102 may be configured to retrain the freight prediction machine learning model when the costs of an amount of shipments of freight are not correctly predicted by the freight prediction machine learning model. For example, freight prediction system 102 may be configured to retrain the freight prediction machine learning model when the freight prediction machine learning model predicts the costs of an amount of shipments of freight are off by more than 5% in average.

In some non-limiting embodiments, if freight prediction system 102 does not validate the freight prediction machine learning model (e.g., when a percentage of correctly predicted costs of shipments of freight does not satisfy the validation threshold, when an average error of predicted costs of shipments of freight does not satisfy the validation threshold, and/or the like), then freight prediction system 102 may generate one or more additional freight prediction machine learning models.

In some non-limiting embodiments, once the freight prediction machine learning model has been validated or devalidated due to low performance, freight prediction system 102 may further train the freight prediction machine learning model and/or generate new freight prediction machine learning models based on receiving new training data. The new training data may include additional data associated with one or more shipments of freight. In some non-limiting embodiments, the new training data may include data associated with costs of one or more shipments of freight. Freight prediction system 102 may use the freight prediction machine learning model to predict costs of the one or more shipments of freight and compare an output of freight prediction machine learning models to the new training data that includes data associated with costs of one or more shipments of freight. In such an example, freight prediction system 102 may update one or more freight prediction machine learning models based on the new training data.

In some non-limiting embodiments, freight prediction system 102 may store the freight prediction machine learning model. For example, freight prediction system 102 may store the freight prediction machine learning model in a data structure (e.g., a database, a linked list, a tree, and/or the like). The data structure may be located within freight prediction system 102 or external (e.g., remote from) freight prediction system 102.

In some non-limiting embodiments, freight prediction system 102 may generate the distance prediction machine learning model in the same or similar manner as the freight prediction machine learning model (e.g., as described herein). In some non-limiting embodiments, the distance prediction machine learning model may be different from the freight prediction machine learning model. For example, the input provided to the distance prediction machine learning model or the output provided by the distance prediction machine learning model may be different from the input provided to the freight prediction machine learning model or the output provided by the freight prediction machine learning model.

In some non-limiting embodiments, freight prediction system 102 may determine a measure of feature importance associated with at least one feature of the freight prediction machine learning model and/or the distance prediction machine learning model. For example, freight prediction system 102 may determine the measure of feature importance associated with a predetermined number (e.g., 10, 20, 30, etc.) of features of the freight prediction machine learning model and/or the distance prediction machine learning model. In some non-limiting embodiments, freight prediction system 102 may remove one or more features from a training dataset based on a measure of feature importance associated with the one or more features of the freight prediction machine learning model and/or the distance prediction machine learning model. For example, freight prediction system 102 may determine the measure of feature importance associated with a plurality of features of the freight prediction machine learning model and/or the distance prediction machine learning model and freight prediction system 102 may determine a ranked list of the plurality of features based on the measure of feature importance associated with each feature of the plurality of features. Freight prediction system 102 may remove the one or more features from the training dataset based on a position of the one or more in the ranked list. In some non-limiting embodiments, freight prediction system 102 may remove the one or more features from the training dataset if the one or more features are in a lowest percentile (e.g., the lowest 10%, the lowest 25%, etc.) of the ranked list. In this way, freight prediction system 102 may reduce an amount of time associated with generating the freight prediction machine learning model and/or the distance prediction machine learning model.

In some non-limiting embodiments, freight prediction system 102 may determine a predicted distance between an origin of one or more shipments of freight and a destination of the one or more shipments of freight. For example, freight prediction system 102 may determine the predicted distance between the origin and a destination of the shipment of freight using the predicted distance machine learning model. In some non-limiting embodiments, freight prediction system 102 may generate the freight prediction machine learning model based on the training dataset and the predicted distance, as described herein. For example, freight prediction system 102 may use an output of the distance prediction machine learning model and the training dataset to generate the freight prediction machine learning model, as described herein.

As shown in FIG. 3, at step 306, process 300 may include determining a predicted cost for a shipment of freight. For example, freight prediction system 102 may determine the predicted cost for the shipment of freight using the freight prediction machine learning model. In some non-limiting embodiments, freight prediction system 102 may determine the predicted cost for the shipment of freight using the freight prediction machine learning model before a shipping invoice is received for the shipment of freight. In some non-limiting embodiments, freight prediction system 102 may determine the predicted cost for the shipment of freight using the freight prediction machine learning model before the shipment of freight is shipped from an origin to a destination.

In some non-limiting embodiments, freight prediction system 102 may generate an updated training dataset to be used to retrain the freight prediction machine learning model. For example, freight prediction system 102 may generate an updated training dataset at a predetermined time interval (e.g., a monthly time interval, a two month time interval, etc.). In some non-limiting embodiments, the updated training dataset comprises data associated with shipments of freight conducted during an updated first time interval and data associated with shipments of freight conducted during an updated second time interval. In some non-limiting embodiments, the updated first time interval is at least a year, and wherein the updated second time interval is shorter than the updated first time interval.

In some non-limiting embodiments, freight prediction system 102 may retrain the freight prediction machine learning model. For example, freight prediction system 102 may retrain the freight prediction machine learning model according to a predetermined time interval (e.g., a predetermined time interval at which an updated training dataset is regularly generated, such as a one month time interval, a three month time interval, etc.) based on the updated training dataset. In some non-limiting embodiments, freight prediction system 102 may retrain the freight prediction machine learning model according to a recent time interval (e.g., a time interval that is within a predetermined amount of time of a present time but that is shorter than a regularly scheduled time interval for retraining the freight prediction machine learning model) based on the updated training dataset. In some non-limiting embodiments, freight prediction system 102 may retrain the freight prediction machine learning model each time an updated training dataset is generated. In some non-limiting embodiments, freight prediction system 102 may evaluate the freight prediction machine learning model and retrain if the performance of the freight prediction machine learning model does not satisfy a performance threshold.

In some non-limiting embodiments, freight prediction system 102 may provide an output of the freight prediction machine learning model to accrual automation system 106. For example, accrual automation system 106 may transmit a request for a predicted cost associated with a shipment of freight to freight prediction system 102. In some non-limiting embodiments, the request may include data associated with the shipment of freight. In the example above, freight prediction system 102 may determine the predicted cost for the shipment of freight using the freight prediction machine learning model. In some non-limiting embodiments, freight prediction system 102 may provide the data associated with the shipment of freight included in the request as an input to the freight prediction machine learning model and the freight prediction machine learning model may provide an output (e.g., the predicted cost of the shipment of freight) based on the input. In the example above, freight prediction system 102 may transmit the predicted cost of the shipment of freight to accrual automation system 106 and accrual automation system 106 may associate the predicted cost with the shipment of freight (e.g., assign the predicted cost to a data record for the shipment of freight) in a database based on receiving the predicted cost from freight prediction system 102. In some non-limiting embodiments, accrual automation system 106 may associate the predicted cost with an invoice for the shipment of freight in the database.

In some non-limiting embodiments, accrual automation system 106 may determine whether to close a data record associated with a shipment of freight (e.g., a record for an accrual associated with the shipment of freight) based on a predicted cost associated with the shipment of freight. For example, accrual automation system 106 may determine whether the predicted cost associated with the shipment of freight corresponds to a cost that is accounted for regarding (e.g., a cost associated with an amount paid for, a cost associated with a total amount of invoices received for) the shipment of freight. If accrual automation system 106 determines that the predicted cost associated with the shipment of freight corresponds to the cost that is accounted for regarding the shipment of freight, then accrual automation system 106 may determine to close the data record. If accrual automation system 106 determines that the predicted cost associated with the shipment of freight does not correspond to the cost that is accounted for regarding the shipment of freight, then accrual automation system 106 may determine not to close the data record. In some non-limiting embodiments, accrual automation system 106 may determine whether the predicted cost associated with the shipment of freight corresponds to the cost that is accounted for regarding the shipment of freight based on a threshold. For example, accrual automation system 106 may determine whether the predicted cost associated with the shipment of freight corresponds to the cost that is accounted for regarding the shipment of freight based on comparing a difference between the predicted cost associated with the shipment of freight and the cost that is accounted for regarding the shipment of freight to threshold. If the difference satisfies the threshold, accrual automation system 106 may determine that the predicted cost associated with the shipment of freight corresponds to the cost that is accounted for regarding the shipment of freight. If the difference does not satisfy the threshold, accrual automation system 106 may determine that the predicted cost associated with the shipment of freight does not correspond to the cost that is accounted for regarding the shipment of freight. In some non-limiting embodiments, the threshold may be based on a freight carrier associated with the shipment of freight. For example, an amount of the threshold may be based on the freight carrier associated with the shipment of freight.

Referring now to FIGS. 4A-4G, illustrated is a non-limiting embodiment of an implementation 400 of a process for predicting costs associated with shipping freight. As shown in FIGS. 4A-4G, implementation 400 may include freight prediction system 402 and accrual automation system 406. In some non-limiting embodiments, freight prediction system 402 may be the same or similar to freight prediction system 102. In some non-limiting embodiments, accrual automation system 406 may be the same or similar to accrual automation system 106.

Figure 4A:
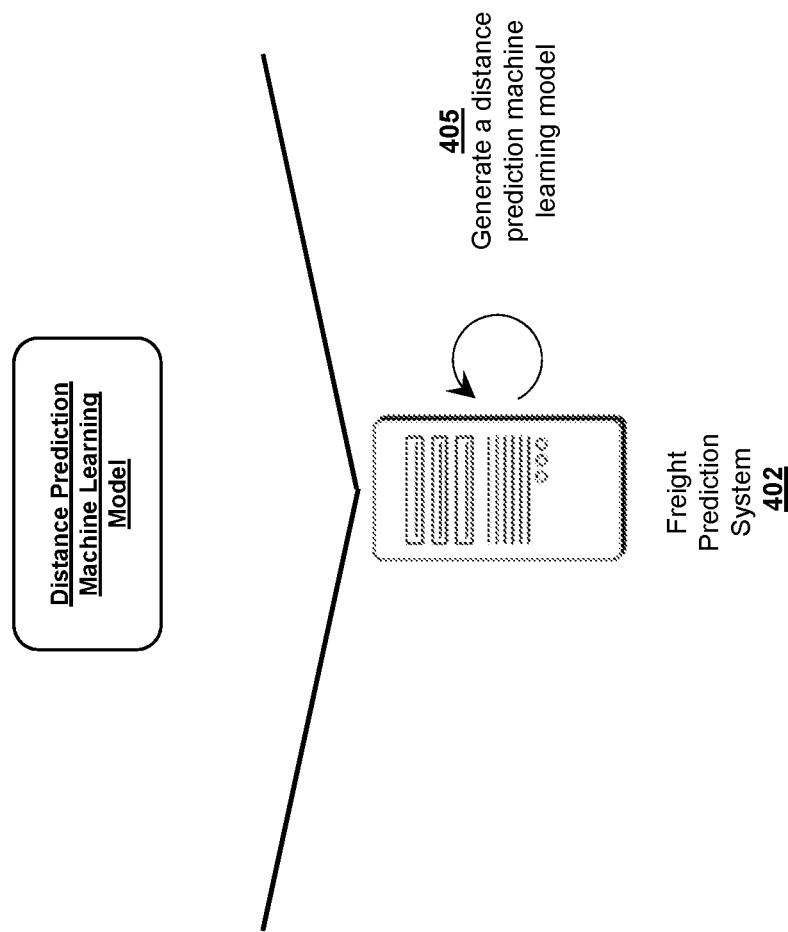

As shown by reference number 405 in FIG. 4A, freight prediction system 402 may generate a distance prediction machine learning model as described herein. In some non-limiting embodiments, freight prediction system 402 may generate the distance prediction machine learning model to provide a predicted distance between an origin of a shipment of freight and a destination of the shipment of freight. In some non-limiting embodiments, the predicted distance is based on a calculation using a Haversine formula.

Figure 4B:
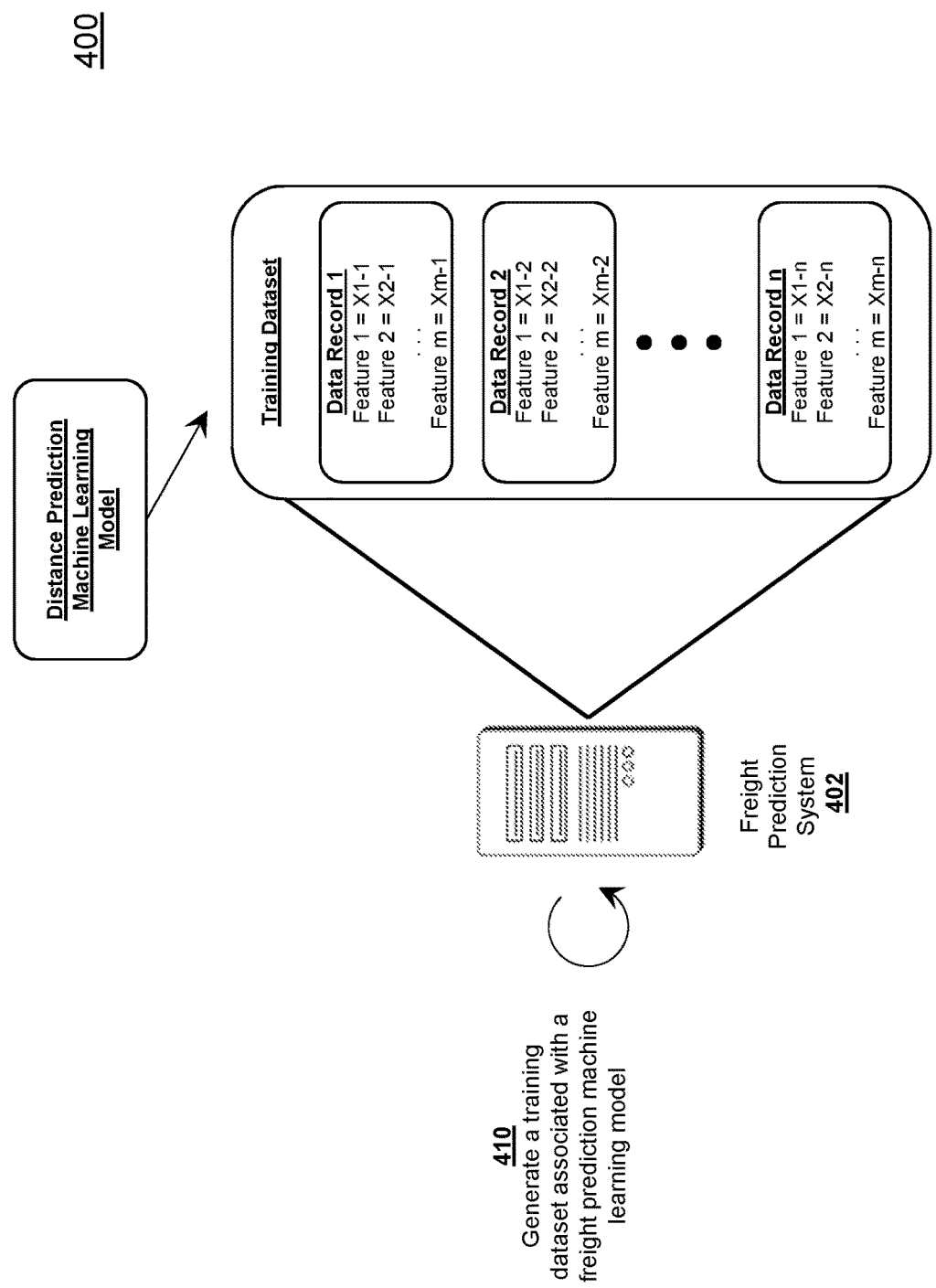

As shown by reference number 410 in FIG. 4B, freight prediction system 402 may generate a training dataset associated with a freight prediction machine learning model. In some non-limiting embodiments, freight prediction system 402 may generate the training dataset associated with the freight prediction machine learning model based on an output of the distance prediction machine learning model. For example, freight prediction system 102 may determine a predicted distance between an origin of a shipment of freight and a destination of each shipment of freight of a plurality of shipments of freight using the distance prediction machine learning model. Freight prediction system 402 may provide, for each data record in the training dataset associated with the freight prediction machine learning model, the output of the distance prediction machine learning model as a value of a feature associated with a distance of a shipment of freight. In this way, freight prediction system 402 may use the output of the distance prediction machine learning model and the training dataset (e.g., via an updated training dataset) to generate the freight prediction machine learning model.

Figure 4C:
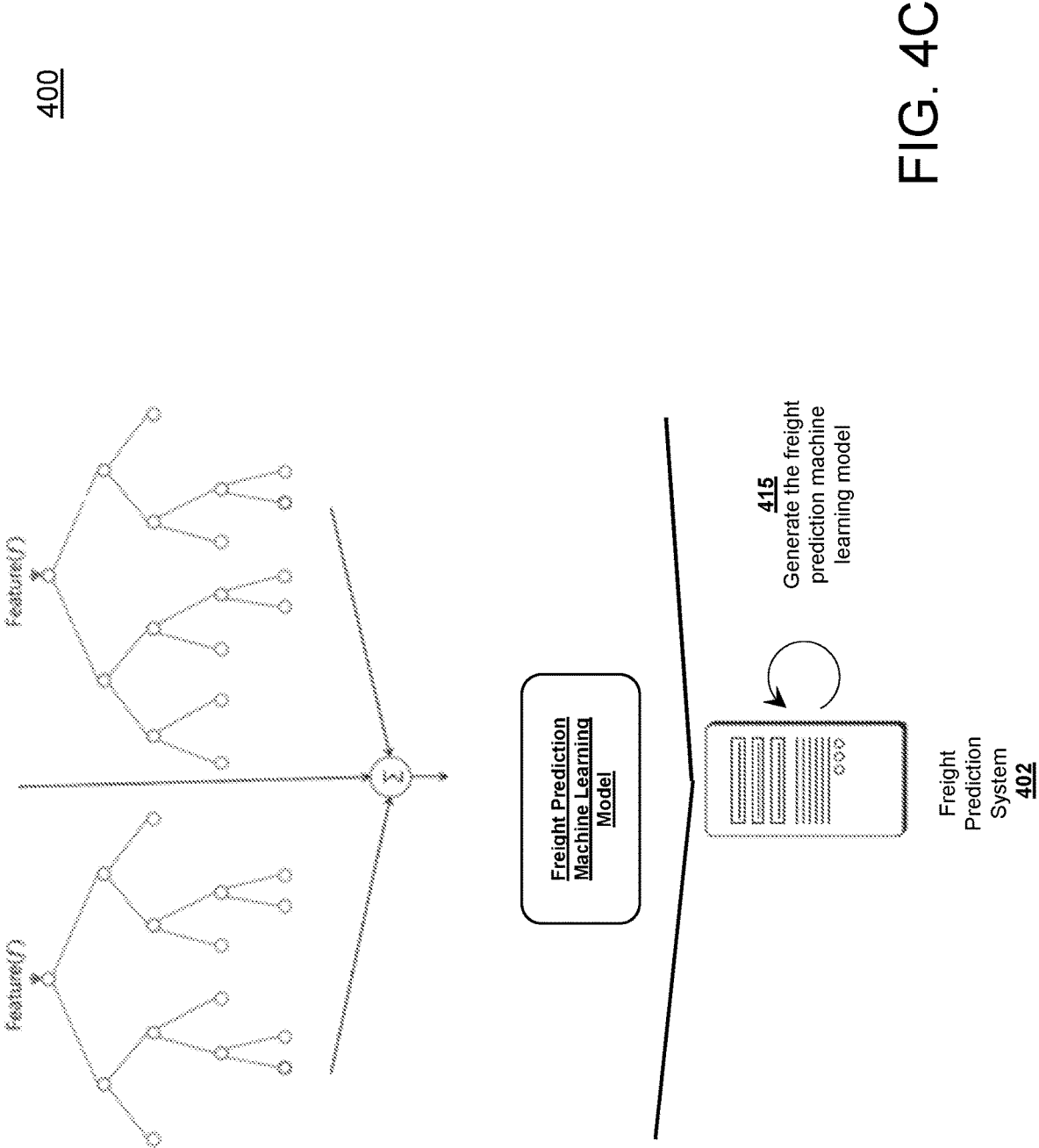

As shown by reference number 415 in FIG. 4C, freight prediction system 402 may generate the freight prediction machine learning model. For example, freight prediction system 402 may generate the freight prediction machine learning model based on the training dataset and the output of the distance prediction machine learning model.

Figure 4D:
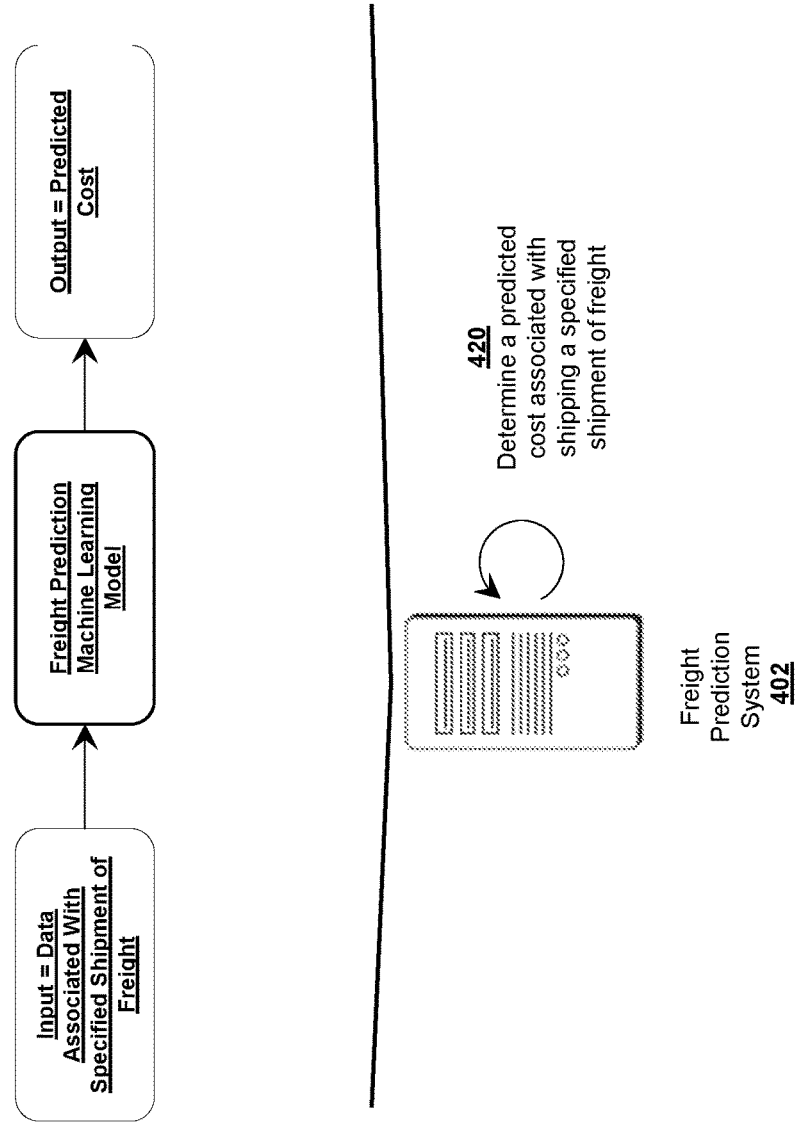
Figure 4E:
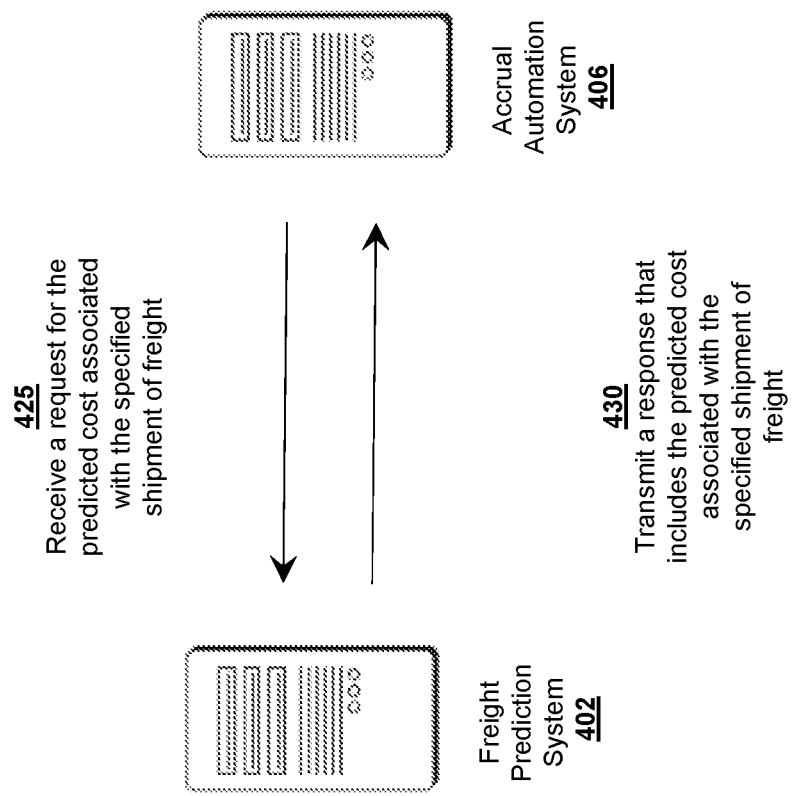

As shown by reference number 420 in FIG. 4D, freight prediction system 402 may determine a predicted cost associated with shipping a specified shipment of freight. For example, freight prediction system 402 may provide data associated with the specified shipment of freight as an input to the freight prediction machine learning model. In some non-limiting embodiments, the data associated with the specified shipment of freight may include data associated with a weight of the specified shipment of freight, data associated with a distance (e.g., a predicted distance) between an origin of the specified shipment of freight and a destination of the specified shipment of freight, data associated with a time period during which the specified shipment of freight is to be shipped, data associated with at least one product included in the specified shipment of freight, and/or the like. For example, freight prediction system 402 may receive data associated with a predicted cost (e.g., a monetary value of predicted cost, such as a U.S. dollar amount) of the specified shipment of freight as an output of the freight prediction machine learning model As shown by reference number 425 in FIG. 4E, freight prediction system 402 may receive a request for the predicted cost associated with the specified shipment of freight from accrual automation system 406. In some non-limiting embodiments, the request may include data associated with an identification of the specified shipment of freight. For example, the request may include an identification number of the specified shipment of freight. In some non-limiting embodiments, freight prediction system 402 may retrieve the predicted cost of the specified shipment of freight based on the data associated with an identification of the specified shipment of freight included in the request from accrual automation system 406. As shown by reference number 430 in FIG. 4E, freight prediction system 402 may transmit a response that includes the predicted cost associated with the specified shipment of freight to accrual automation system 406.

Figure 4F:
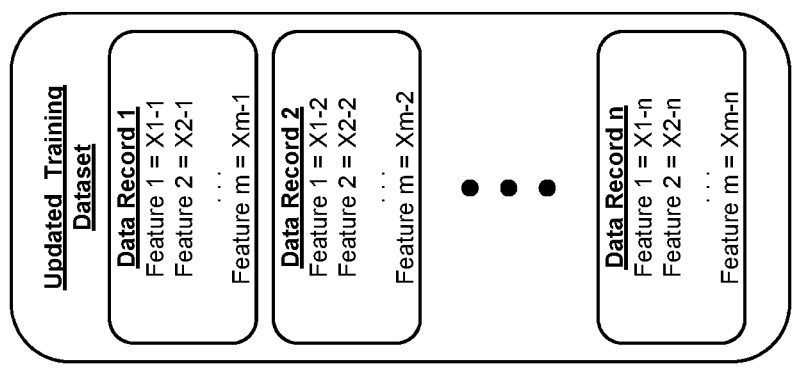
Figure 4F:
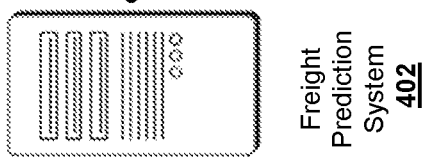
Figure 4F:

As shown by reference number 435 in FIG. 4F, freight prediction system 402 may generate an updated training dataset associated with the freight prediction machine learning model. In some non-limiting embodiments, freight prediction system 402 may generate an updated training dataset at a predetermined time interval. In some non-limiting embodiments, the updated training dataset may include data associated with shipments of freight conducted during an updated first time interval and data associated with shipments of freight conducted during an updated second time interval. In some non-limiting embodiments, the updated first time interval may be at least a year and the updated second time interval may be shorter than the updated first time interval. In some non-limiting embodiments, the updated first time interval may be the same or similar to the first time interval used in the training dataset (e.g., the training dataset used to generate the freight prediction machine learning model). In some non-limiting embodiments, the updated second time interval may be the same or similar to the second time interval used in the training dataset.

As shown by reference number 440 in FIG. 4G, freight prediction system 402 may retrain the freight prediction machine learning model based on the updated training dataset. In some non-limiting embodiments, freight prediction system 402 may retrain the freight prediction machine learning model according to the predetermined time interval based on the updated training dataset. In some non-limiting embodiments, freight prediction system 402 may retrain the freight prediction machine learning model according to a recent time interval based on the updated training dataset.

As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Although the above systems, methods, and computer program products have been described in detail for the purpose of illustration based on what is currently considered to be the most practical and/or preferred embodiments, it is to be understood that such detail is solely for that purpose and that the present disclosure is not limited to the described embodiments but, on the contrary, is intended to cover modifications and equivalent arrangements that are within the spirit and scope of the appended claims. For example, it is to be understood that the present disclosure contemplates that, to the extent possible, at least one feature of any embodiment can be combined with at least one feature of any other embodiment.

What is claimed is:

1. A system for predicting costs associated with shipping freight, comprising:
at least one processor programmed or configured to:
determine a predicted distance between an origin of a shipment of freight to a destination of the shipment of freight, wherein, when determining the predicted distance, the at least one processor is programmed or configured to:
generate a predicted distance machine learning model to provide a predicted distance between the origin of the shipment of freight and the destination of the shipment of freight; and
use the predicted distance machine learning model to provide an output, wherein the output comprises the predicted distance between the origin of the shipment of freight and the destination of the shipment of freight;
generate a training dataset for a freight production machine learning model, wherein a portion of the training dataset comprises the output of the predicted distance machine learning model;
generate the freight prediction machine learning model according to an ensemble method, to provide a predicted cost associated with shipping the shipment of freight from the origin of the shipment of freight to the destination of the shipment of freight base on the training dataset, wherein the freight prediction machine learning model comprises a random forest algorithm that provides a continuous variable as an output, wherein the continuous variable comprises the predicted cost associated with shipping the shipment of freight, wherein the training dataset comprises data associated with shipments of freight conducted during a first time interval and data associated with shipments of freight conducted during a second time interval, and wherein the first time interval is at least a year and wherein the second time interval is shorter than the first time interval, wherein, when generating the freight prediction machine learning model, the at least one processor is programmed or configured to:
train the freight prediction machine learning model based on the training dataset that comprises one or more outputs of the predicted distance machine learning model;
determine a predicted cost associated with shipping a specified shipment of freight from an origin of the specified shipment of freight to a destination of the specified shipment of freight using the freight predicting machine learning model;
generate an updated training dataset at a predetermined time interval, wherein the updated training dataset comprises data associated with shipments of freight conducted during an updated first time interval and data associated with shipments of freight conducted during an updated second time interval, and wherein the updated second time interval is shorter than the updated first time interval; and
retain the freight prediction machine learning model according to the predetermined time interval based on the updated training dataset;
wherein, when generating the freight prediction machine learning model, the at least one processor is programmed or configured to:
generate the freight prediction machine learning model such that at each step the random forest algorithm provides decision trees at random and keeps a decision tree that minimizes a remaining mean squared error (MSE) according to the formula:

$$MSE = \frac{1}{n}\sum(y - \hat{y})^2$$

where y is an actual cost for a shipment of freight, ŷ is a predicted cost for a shipment of freight, and n is a number of observations in the training dataset.

2. The system of claim 1, wherein, when generating the predicted distance machine learning model, the at least one processor is programmed or configured to:
generate the predicted distance machine learning model to provide the predicted distance between the origin of the shipment of freight and the destination of the shipment of freight, wherein the predicted distance is based on a calculation using a Haversine formula.

3. The system of claim 1, wherein the at least one processor is further programmed or configured to:
provide the output of the second machine learning model as an input to the first freight prediction machine learning model; and
wherein, when determining the predicted cost associated with shipping the shipment of freight, the at least one processor is further programmed or configured to:
determine the predicted cost associated with shipping the specified shipment of freight from the origin of the specified shipment of freight to the destination of the specified shipment of freight using the freight prediction machine learning model based on the input to the freight prediction machine learning model.

4. The system of claim 1, wherein the at least one processor is further programmed or configured to:
determine a measure of feature importance associated with one or more features of the freight prediction machine learning model; and
remove the one or more features of the freight prediction machine learning model from the training dataset based on the measure of feature importance associated with the one or more features of the freight prediction machine learning model to provide an adjusted training dataset; and
wherein, when training the freight prediction machine learning model, the at least one processor is programmed or configured to:
train the freight prediction machine learning model based on the adjusted training dataset.

5. The system of claim 1, wherein the updated first time interval is at least a year.

6. The system of claim 5, wherein, when retraining the freight prediction machine learning model, the at least one processor is programmed or configured to:
retrain the freight prediction machine learning model according to a recent time interval based on the updated training dataset.

7. The system of claim 1, wherein a plurality of features of the freight prediction machine learning model comprises:
a feature associated with a weight of a shipment of freight;
a feature associated with a distance between an origin of a shipment of freight and a destination of a shipment of freight;
a feature associated with a time period during which a shipment of freight is to be shipped;
a feature associated with at least one product included in a shipment of freight; or
any combination thereof.

8. The system of claim 1 wherein, when generating the freight prediction machine learning model, the at least one processor is programmed or configured to:
process the training dataset by deriving a freight prediction variable based on the data, wherein the freight prediction variable comprises:
a variable associated with a weight of a shipment of freight,
a variable associated with a distance between an origin of a shipment of freight and a destination of a shipment of freight,
a variable associated with a time period during which a shipment of freight is to be or was shipped,
a variable associated with at least one product included in a shipment of freight, or
any combination thereof;
wherein, when training the freight prediction machine learning mode, the at least one processor is programmed or configured to:
train the freight prediction machine learning model based on the freight prediction variable.

9. A computer program product for predicting costs associated with shipping freight comprising at least one non-transitory computer-readable medium including one or more instructions that, when executed by at least one processor, cause the at least one processor to:
determine a predicted distance between an origin of a shipment of freight to a destination of the shipment of freight, wherein, the one or more instructions that cause the at least one processor to determine the predicted distance, cause the at least one processor to:
generate a predicted distance machine learning model to provide a predicted distance between the origin of the shipment of freight and the destination of the shipment of freight; and
use the predicted distance machine learning model to provide an output, wherein the output comprises the predicted distance between the origin of the shipment of freight and the destination of the shipment of freight;
generate a training dataset for a freight prediction machine learning model, wherein a portion of the training dataset comprises the output of the predicted distance machine learning model;
generate the freight prediction machine learning model to provide a predicted cost associated with shipping the shipment of freight from the origin of the shipment of freight to the destination of the shipment of freight based on the training dataset, wherein the freight prediction machine learning model comprises a random forest algorithm that provides a continuous variable as an output, wherein the continuous variable comprises the predicted cost associated with shipping the shipment of freight, wherein the training dataset comprises data associated with shipments of freight conducted during a first time interval and data associated with shipments of freight conducted during a second time interval, and wherein the first time interval is at least a year and wherein the second time interval is shorter than the first time interval, wherein, the one or more instructions that cause the at least one processor to generate the freight prediction machine learning model, cause the at least one processor to:
train the freight prediction machine learning model based on the training dataset that comprises one or more outputs of the predicted distance machine learning model;

determine a predicted cost associated with shipping a specified shipment of freight from an origin of the specified shipment of freight to a destination of the specified shipment of freight using the freight prediction machine learning model;

generate an updated training dataset at a predetermined time interval, wherein the updated training dataset comprises data associated with shipments of freight conducted during an updated first time interval and data associated with shipments of freight conducted during an updated second time interval, and wherein the updated second time interval is shorter than the updated first time interval; and retain the freight prediction machine learning model according to the predetermined time interval based on the updated training dataset;

wherein, the one or more instructions that cause the at least one processor to generate the freight prediction machine learning model, cause the at least one processor to:

generate the freight prediction machine learning model such that at each step the random forest algorithm provides decision trees at random and keeps a decision tree that minimizes a remaining mean squared error (MSE) according to the formula:

$$MSE = \frac{1}{n}\sum(y - \hat{y})^2$$

where y is an actual cost for a shipment of freight, $\hat{y}$ is a predicted cost for a shipment of freight, and n is a number of observations in the training dataset.

10. The computer program product of claim 9, wherein the one or more instructions that cause the at least one processor to generate the predicted distance machine learning model, cause the at least one processor to:

generate the predicted distance machine learning model to provide the predicted distance between the origin of the shipment of freight and the destination of the shipment of freight, wherein the predicted distance is based on a calculation using a Haversine formula.

11. The computer program product of claim 9, wherein the one or more instructions further cause the at least one processor to:

provide the output of the predicted distance machine learning model as an input to the freight prediction machine learning model; and wherein the one or more instructions that cause the at least one processor to determine the predicted cost associated with shipping the shipment of freight, cause the at least one processor to:

determine the predicted cost associated with shipping the specified shipment of freight from the origin of the specified shipment of freight to the destination of the specified shipment of freight using the freight prediction machine learning model based on the input to the freight prediction machine learning model.

12. The computer program product of claim 9, wherein, the one or more instructions that cause the at least one processor to generate the freight prediction machine learning model, cause the at least one processor to:

process the training dataset by deriving a freight prediction variable based on the data, wherein the freight prediction variable comprises:

a variable associated with a weight of a shipment of freight, a variable associated with a distance between an origin of a shipment of freight and a destination of a shipment of freight, a variable associated with a time period during which a shipment of freight is to be or was shipped, a variable associated with at least one product included in a shipment of freight, or any combination thereof;

wherein, the one or more instructions that cause the at least one processor to train the freight prediction machine learning model, cause the at least one processor to:

train the freight prediction machine learning model based on the freight prediction variable.

13. The computer program product of claim 9, wherein the one or more instructions further cause the at least one processor to:

determine a measure of feature importance associated with one or more features of the freight prediction machine learning model; and remove the one or more features from the training dataset based on the measure of feature importance associated with the one or more features of the freight prediction machine learning model to provide an adjusted training dataset; and wherein, when training the freight prediction machine learning model, the at least one processor is programmed or configured to:

train the freight prediction machine learning model based on the adjusted training dataset.

14. A method for predicting costs associated with shipping freight, comprising:

determining, with at least one processor, a predicted distance between an origin of a shipment of freight to a destination of the shipment of freight, wherein determining the predicted distance comprises:

generating a predicted distance machine learning model to provide a predicted distance between the origin of the shipment of freight and the destination of the shipment of freight; and using the predicted distance machine learning model to provide an output, wherein the output comprises the predicted distance between the origin of the shipment of freight and the destination of the shipment of freight;

generating, with at least one processor, a training dataset for a freight prediction machine learning model, wherein a portion of the training dataset comprises the output of the predicted distance machine learning model;

generating, with at least one processor, the freight prediction machine learning model to provide a predicted cost associated with shipping the shipment of freight from the origin of the shipment of freight to the destination of the shipment of freight based on the training dataset, wherein the freight prediction machine learning model comprises a random forest algorithm that provides a continuous variable as an output, wherein the continuous variable comprises the predicted cost associated with shipping the shipment of freight, wherein the training dataset comprises data associated with shipments of freight conducted during a first time interval and data associated with shipments of freight conducted during a second time interval, and wherein the first time interval is at least a year and wherein the second time interval is shorter that the first time interval, wherein generating the freight prediction machine learning model comprises:
- training the freight prediction machine learning model based on the training dataset that comprises one or more outputs of the predicted distance machine learning model;
- determining, with at least one processor, a predicted cost associated with shipping a specified shipment of freight from an origin of the specified shipment of freight to a destination of the specified shipment of freight using the machine learning model;
- generating, with at least one processor, an updated training dataset at a predetermined time interval, wherein the updated training dataset comprises data associated with shipments of freight conducted during an updated first time interval and data associated with shipments of freight conducted during an updated second time interval, and wherein the updated second time interval is shorter that the updated first time interval; and
- retraining, with at least one processor, the freight prediction machine learning model according to the predetermined time interval based on the updated training dataset;
- wherein generating the freight prediction machine learning model comprises:
  - generating the freight prediction machine learning model such that at each step the random forest algorithm provides decision trees at random and keeps a decision tree that minimizes a remaining mean squared error (MSE) according to the formula:

$$MSE = \frac{1}{n}\sum(y - \hat{y})^2$$

where y is an actual cost for a shipment of freight, $\hat{y}$ is a predicted cost for a shipment of freight, and n is a number of observations in the training dataset.

15. The method of claim 14, wherein generating the predicted distance machine learning model comprises:
- generating the predicted distance machine learning model to provide the predicted distance between the origin of the shipment of freight and the destination of the shipment of freight, wherein the predicted distance is based on a calculation using a Haversine formula.

16. The method of claim 14, further comprising:
- providing the output of the predicted distance machine learning model as an input to the freight prediction machine learning model; and
- wherein determining the predicted cost associated with shipping the shipment of freight comprises:
  - determining the predicted cost associated with shipping the specified shipment of freight from the origin of the specified shipment of freight to the destination of the specified shipment of freight using the freight prediction machine learning model based on the input to the freight prediction machine learning model.

17. The method of claim 14, wherein the freight prediction machine learning model is a machine learning model generated according to an ensemble method.

18. The method of claim 14, wherein generating the freight prediction machine learning model comprises:
- processing the training dataset by deriving a freight prediction variable based on the data, wherein the freight prediction variable comprises:
  - a variable associated with a weight of a shipment of freight,
  - a variable associated with a distance between an origin of a shipment of freight and a destination of a shipment of freight,
  - a variable associated with a time period during which a shipment of freight is to be or was shipped,
  - a variable associated with at least one product included in a shipment of freight, or
  - any combination thereof;
- wherein training the freight prediction machine learning model comprises:
  - training the freight prediction machine learning model based on the freight prediction variable.

19. The method of claim 14, further comprising:
- determining a measure of feature importance associated with one or more features of the freight prediction machine learning model; and
- removing the one or more features from the training dataset based on the measure of feature importance associated with the one or more features of the freight prediction machine learning model to provide an adjusted training dataset; and
- wherein training the freight prediction machine learning model comprises:
  - training the freight prediction machine learning model based on the adjusted training dataset.

* * * * *